(12) United States Patent
Konishi et al.

(10) Patent No.: US 6,930,644 B2
(45) Date of Patent: Aug. 16, 2005

(54) DEVICE-CARRIED ANTENNA AND METHOD OF AFFIXING SAME

(75) Inventors: Michihiro Konishi, Kawasaki (JP); Hideaki Kamikakoi, Kawasaki (JP); Minoru Kumagai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 13 days.

(21) Appl. No.: 10/767,328

(22) Filed: Jan. 29, 2004

(65) Prior Publication Data

US 2004/0183732 A1 Sep. 23, 2004

(30) Foreign Application Priority Data

Jan. 31, 2003 (JP) ........................................ 2003-024642
Jan. 31, 2003 (JP) ........................................ 2003-024671

(51) Int. Cl.[7] .................................................. H01Q 1/24
(52) U.S. Cl. ....................................... 343/702; 343/846
(58) Field of Search ................................ 343/702, 846, 343/848, 700 MS

(56) References Cited

U.S. PATENT DOCUMENTS 6,650,298 B2 * 11/2003 Abbasi et al. ............... 343/702
6,686,886 B2 * 2/2004 Flint et al. ................... 343/702
6,853,336 B2 * 2/2005 Asano et al. ................ 343/702

FOREIGN PATENT DOCUMENTS

JP        2001-44726        2/2001

* cited by examiner

Primary Examiner—Hoang V. Nguyen
(74) Attorney, Agent, or Firm—Greer, Burns & Crain, Ltd.

(57) ABSTRACT

An antenna not requiring screws etc. for affixing it to a liquid crystal display unit, able to be applied in the same shape and dimensions even for units of different dimensions or shapes, and giving a good radiating characteristic and gain characteristic of the antenna itself, provided with a support designed to straddle a projecting ridge of a housing and supported by the housing, a ground contact spring extending from the support to the side surface of the unit to contact the side surface of the unit, and an antenna element extending from the support to the opposite side of the support from the ground contact spring; the support, ground contact spring, and antenna element being formed integrally by sheet metal.

29 Claims, 10 Drawing Sheets

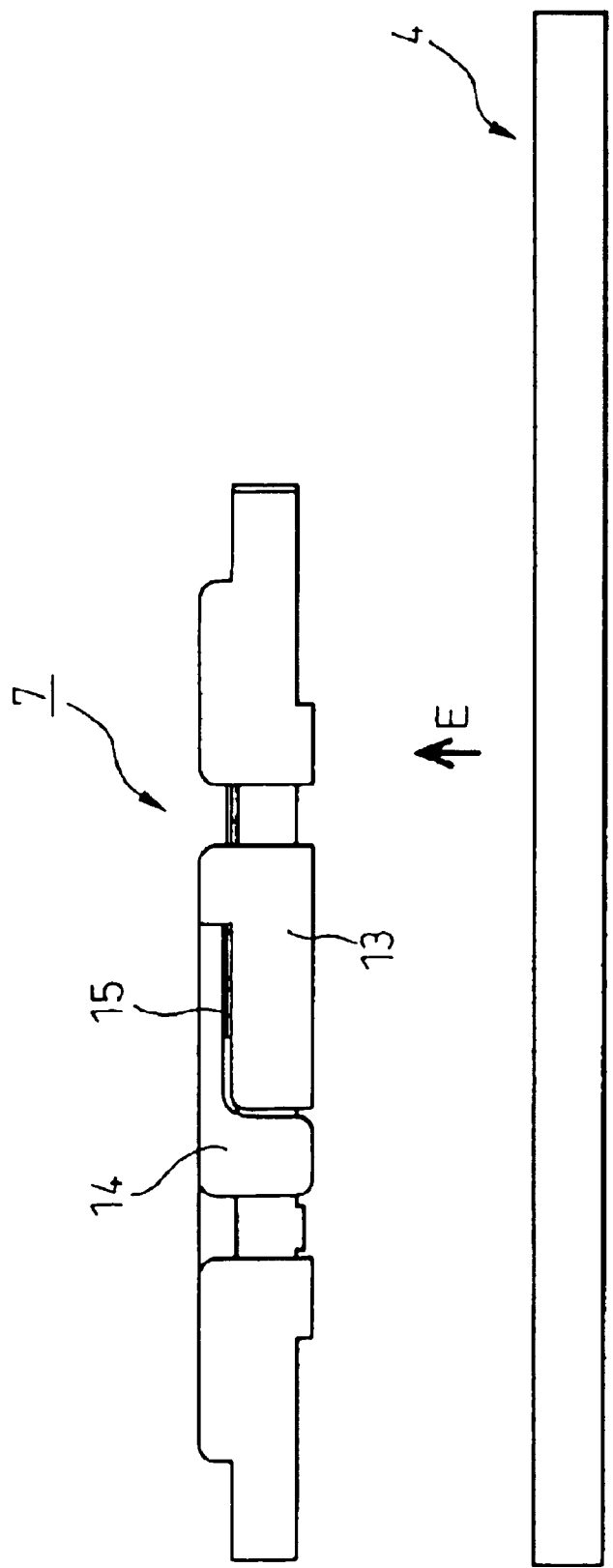

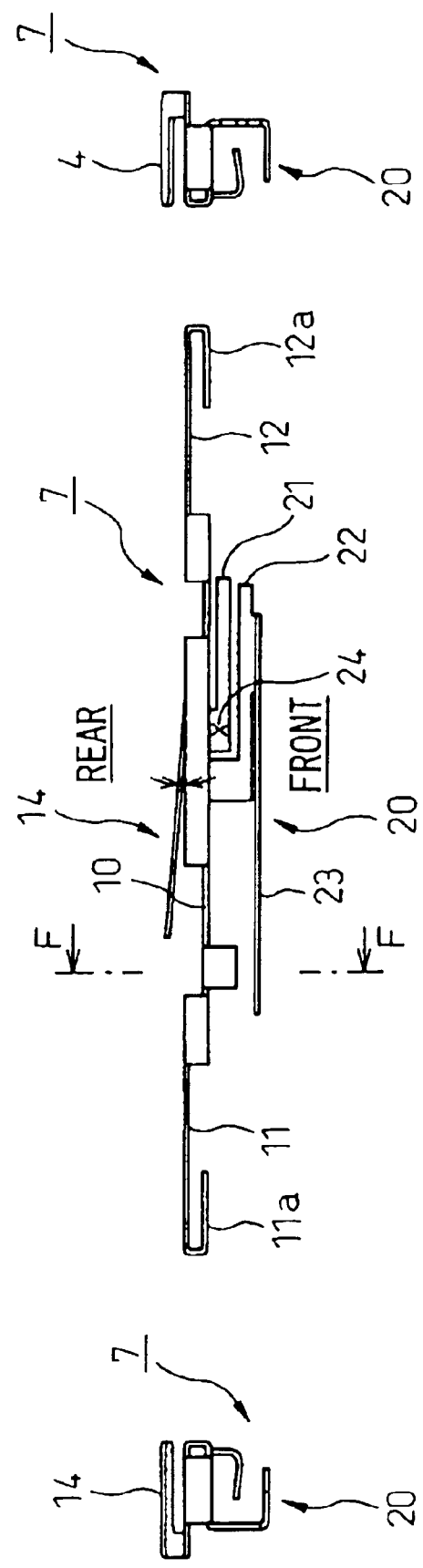

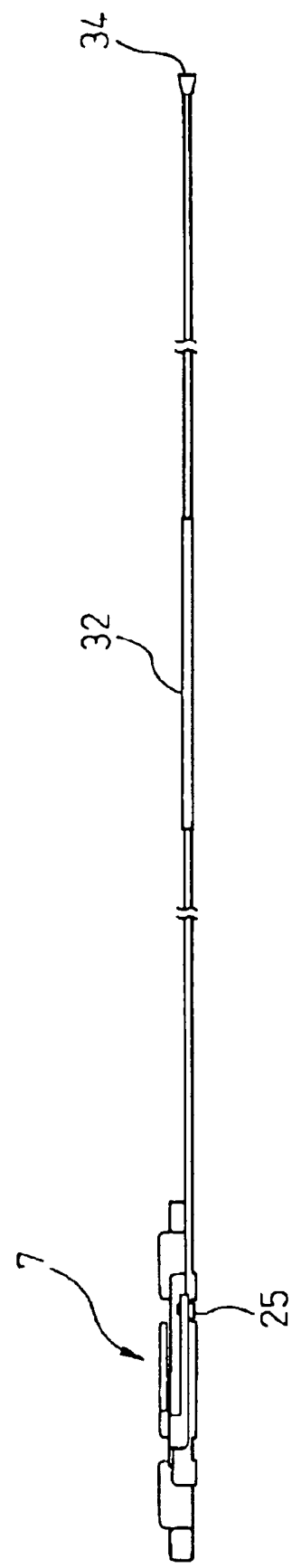

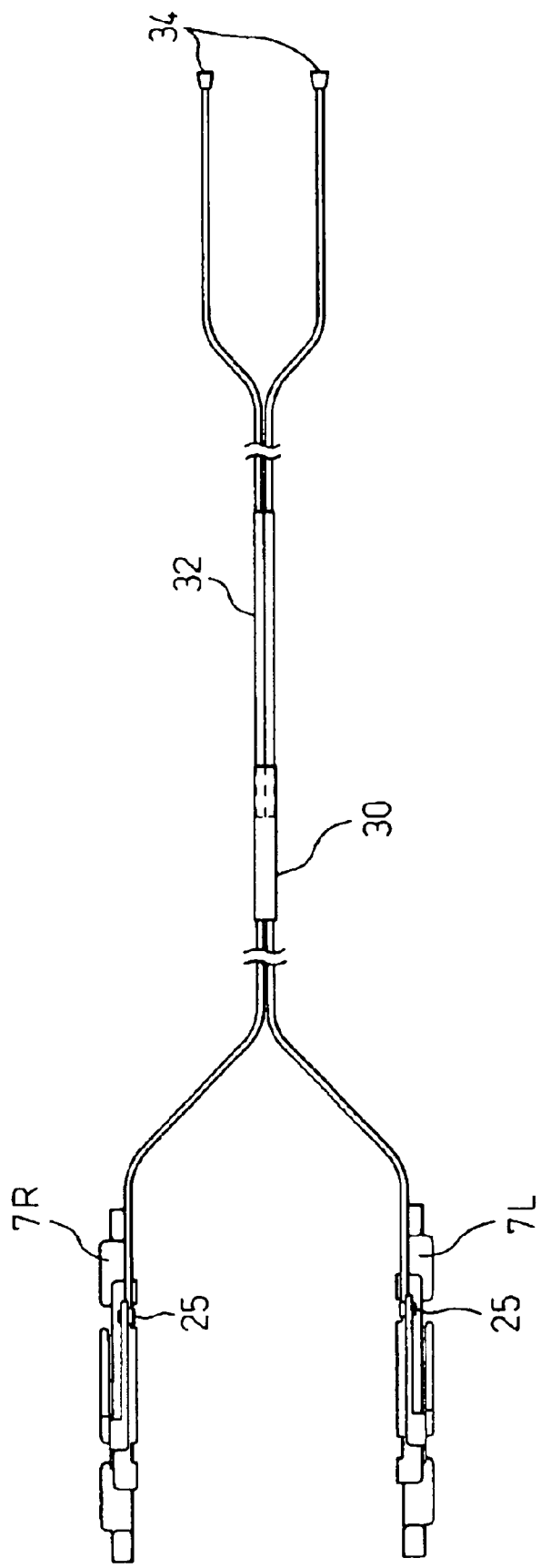

DEVICE-CARRIED ANTENNA AND METHOD OF AFFIXING SAME

BACKGROUND OF THE INVENTION

1. Field of the Invention

The present invention relates to a device-carried antenna and a device using that antenna and to a method of affixing an antenna and a device using that method, in particular a device-carried antenna improving the mounting structure of the antenna to the device and a device using that antenna and a method of affixing a device-carried antenna improving the method of affixing an antenna to a device and a device using that method.

Information communication devices are being required to be made smaller in size and lighter in weight. In particular, in mobile devices carrying antennas, for example, laptop personal computers, mobile phones, and other mobile communication devices and other communication devices, it is necessary to connect the antenna to an electronic circuit on the circuit board in the device.

2. Description of the Related Art

In the past, in various types of devices incorporating built-in antennas, it was difficult to secure a good gain characteristic for the entire periphery of the device with the radiating characteristics of the antennas themselves, so the general practice had been to pass the antenna current through metal exposed when seen from the electromagnetic field of the devices so as to generate an electromagnetic field. However, if the positional relationship between the element of the antenna and a conductor in proximity to the antenna element changes, the characteristics will change, so with the conventional method, it was necessary to either change the structural dimensions of the conductor connections (screwed down) of the antenna or else provide a contact separate from the antenna.

Japanese Unexamined Patent Publication (Kokai) No. 2001-44726 discloses an antenna affixing structure where a housing is split into a top case and a bottom case and the antenna is mounted at the connecting part of these cases, wherein one of the split cases is provided with an antenna holding seat with which an antenna base end can be engaged, the other of the split cases is provided with projecting ribs, and the split cases are joined to grip the antenna base end between the antenna holding seat and the projecting ribs. Due to this, it is possible to affix the antenna to the housing without using screws.

Japanese Unexamined Patent Publication (Kokai) No. 2000-261220 discloses to prevent deformation of an antenna connection terminal and to enable good contact of the front end of the antenna connection terminal with a predetermined circuit of the circuit board at all times by providing an antenna connection terminal affixed to an antenna part at its rear end and having springiness, a circuit board overlapping a front end of the antenna connection terminal and contacting the front end, and a projection formed at a cable inside surface of a bottom surface of the antenna connection terminal and having a front end facing the bottom surface of the antenna connection terminal across a predetermined gap. Due to this, the flexings of the antenna connection terminal and the circuit board are suppressed to a small state.

As explained above, in a device with a built-in antenna, in the past, the radiating characteristic or gain characteristic of the antenna itself changed due to the positional relationship of the conductors of the device and the antenna itself and other factors, so it was necessary to screw down the conductor connections of the antenna etc. so as to mount the antenna at a position corresponding to exact type of the device or else to change the shape or dimensions of the antenna in accordance with the shape, dimensions, etc. of the conductor connections of an individual device.

SUMMARY OF THE INVENTION

A first object of the present invention is to provide a device-carried antenna which can be applied to various types of devices, in particular various types of devices differing in the shape, dimensions, etc. of the conductor connections, and a device able to carry such an antenna.

A second object of the present invention is to provide a method for affixing a device-carried antenna and a device using that method.

A third object of the present invention is to provide an antenna having conductor connections of a box shape, that is, having conductor connection parts occupying a positional region similar to parts in the X, Y, and Z directions, and able to improve the radiating characteristic and gain characteristic of the antenna as much as possible and a device able to carry such an antenna and a method of affixing an antenna and a device using that method.

According to a first aspect of the present invention, there is provided an antenna comprised of an antenna element, a support, and a ground contact spring formed integrally from sheet metal, wherein the antenna element is located at one side with respect to the support, and the ground contact spring extends to the other side from the support in an elastically deformable manner.

Preferably, the support has a shape extending in a longitudinal direction, and the ground contact spring is inclined with respect to a longitudinal direction of the support by a predetermined angle toward the outside.

Preferably, the support is designed to straddle a projecting ridge extending in a longitudinal direction and has a shape enabling it to be attached and fixed to the projecting ridge, has at its two ends parts curved in U-shapes extending from one surface of the projecting ridge to the other surface, and is structured so that when the antenna is mounted on the projecting ridge, the U-shaped curved parts at the two ends of the antenna support in the longitudinal direction are fit over the two ends of the projecting ridge in the longitudinal direction to affix the same.

Preferably, the sheet metal is springy sheet metal with a good solder deposition property and no surface treatment, for example, is German silver.

According to a second aspect of the present invention, there is provided a device comprised of a housing having a projecting ridge, a functional unit having a conductor at its periphery and affixed to the housing so that at least part of the periphery adjoins the projecting ridge, and an antenna, wherein the antenna is comprised of a support designed to straddle the projecting ridge and supported by the housing, a ground contact spring extending from the support to the periphery of the functional unit and contacting at least part of the periphery of the functional unit, and an antenna element extending from the support to an opposite side of the support when seen from the ground contact spring, the support, ground contact spring, and antenna element being integrally formed by sheet metal.

According to a third aspect of the present invention, there is provided a device comprised of a functional unit, a lid able to open and close with respect to the functional unit via a hinge and having a display, and an antenna, wherein the lid is provided with a housing having a projecting ridge and a display having a conductor at its periphery and affixed to the housing so that at least part of the periphery adjoins the projecting ridge, and the antenna is comprised of a support designed to straddle the projecting ridge and supported by the housing, a ground contact spring extending from the support to the periphery of the functional unit and contacting at least part of the periphery of the functional unit, and an antenna element extending from the support to an opposite side of the support when seen from the ground contact spring, the support, ground contact spring, and antenna element being integrally formed by sheet metal.

Preferably, a pair of projecting ridges of the lid housing is provided at an interval on the same line along the front surface of the display, and a pair of antennas is mounted on the pair of projecting ridges.

According to a fourth aspect of the present invention, there is provided a method of affixing an antenna comprised of an antenna element, a support, and a ground contact spring formed integrally from sheet metal, the antenna element being located at one side with respect to the support and the ground contact spring being located at the other side extending from the support in an elastically deformable manner, the method comprising mounting the support of the antenna to a projecting ridge so as to straddle the projecting ridge and bringing the ground contact spring into contact with the ground conductor at the same time as mounting.

Preferably, the method further comprises using as the support one having a shape extending in the longitudinal direction, inclining the ground contact spring with respect to the longitudinal direction of the support by a predetermined angle to the outside, and fitting the support over the projecting ridge to straddle the projecting ridge and thereby affix the same.

Preferably, the method further comprises using as the support one having at two ends of the projecting ridge extending in a longitudinal direction portions bent into U-shapes extending from one surface of the projecting ridge to the other surface and fitting the U-shaped curved parts at the two ends in the longitudinal direction of the antenna support over the two ends in the longitudinal direction of the projecting ridge so as to mount the antenna on the projecting ridge.

According to a fifth aspect of the invention, there is provided a device comprised of a functional unit, a lid able to open and close with respect to the functional unit via a hinge and having a display, and an antenna, wherein the lid is provided with a housing having a projecting ridge for mounting the antenna and a display having a conductor at least at part of its periphery and affixed to the housing so that at least part of the periphery adjoins the projecting ridge.

Preferably, a pair of projecting ridges of the housing of the lid are provided at an interval on the same line along the front surface of the display.

According to a sixth aspect of the invention, there is provided a device comprising a housing having a projecting ridge, a functional unit having a conductor at least at part of its periphery and affixed to the housing so that at least part of the periphery adjoins the projecting ridge, and an antenna, wherein a ground contact spring is arranged to contact a ground conductor of the functional unit at the same time as mounting of the antenna.

According to a seventh aspect of the invention, there is provided a device provided with a functional unit, a lid able to open and close with respect to the functional unit via a hinge and having a display, and an antenna, wherein the lid is provided with a housing having a projecting ridge and a display having a ground conductor at least at part of its periphery and affixed to the housing so that the side surface adjoins the projecting ridge, and a ground contact spring is arranged to contact the ground conductor of the functional unit at the same time as mounting of the antenna.

BRIEF DESCRIPTION OF THE DRAWINGS

These and other objects and features of the present invention will become clearer from the following description of the preferred embodiments given with reference to the attached drawings, wherein:

FIG. 3A is a perspective view of the device shown in FIG. 1 with the portion of the lid shown by A partially cut away, while

FIG. 4A is a perspective view of the device shown in FIG. 1 with the portion of the lid shown by B partially cut away, while

FIG. 5A is a perspective view of an antenna of the present invention seen from the side of the antenna ground part, while

FIG. 6 is a back view of the antenna of the present invention and shows also a liquid crystal display unit;

FIG. 7 is a plan view of the antenna of the present invention seen from the arrow E of FIG. 6 and a left-right side view;

FIG. 11 is a wiring diagram of the case of use of a single antenna of the present invention; and FIG. 12 is a wiring diagram of the case of use of a pair of antennas of the present invention.

DESCRIPTION OF THE PREFERRED EMBODIMENTS

Figure 1:
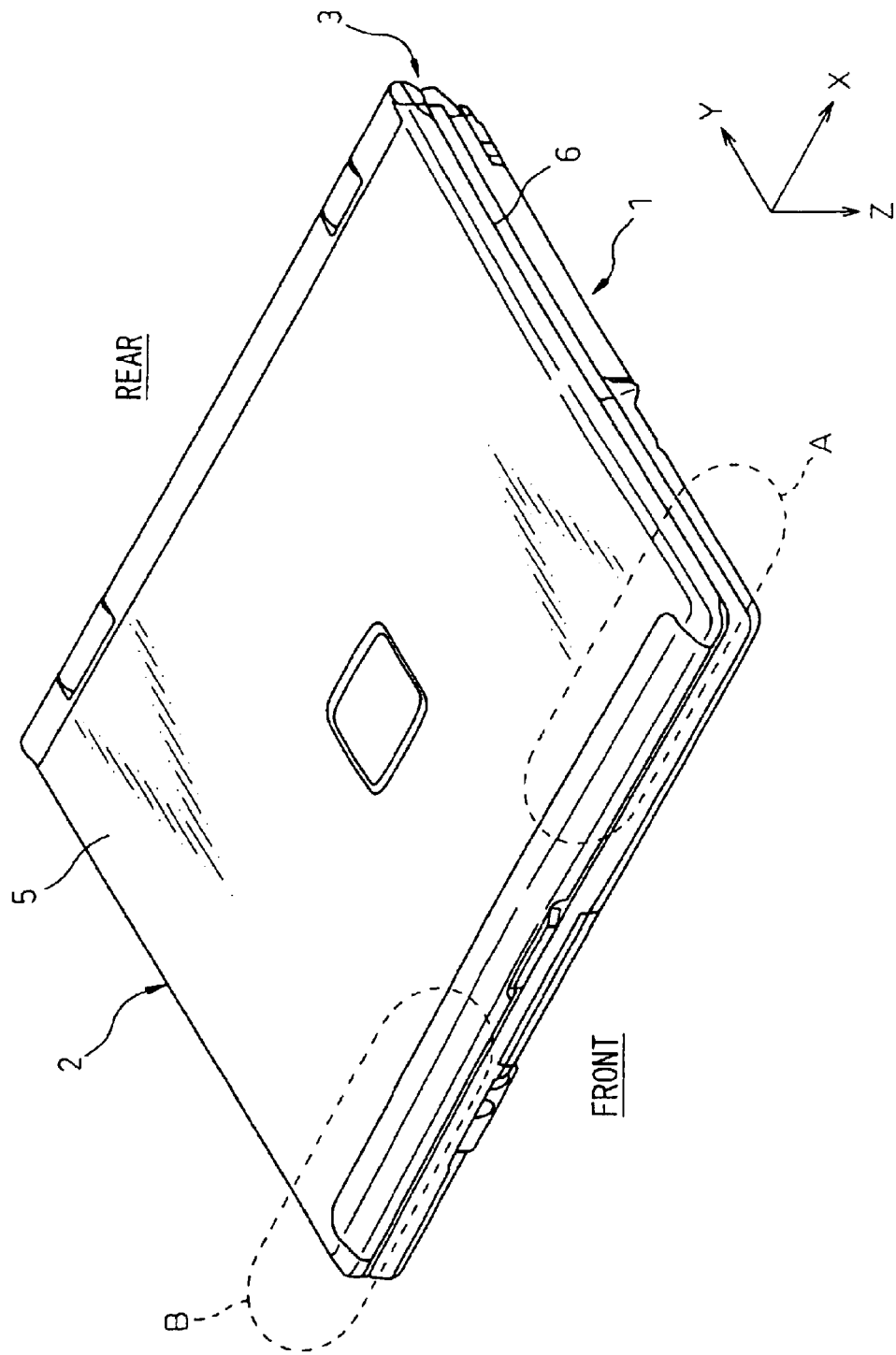
FIG. 1 is an external perspective view of a laptop personal computer according to an embodiment of a device using an antenna of the present invention in a closed state.
Figure 2:
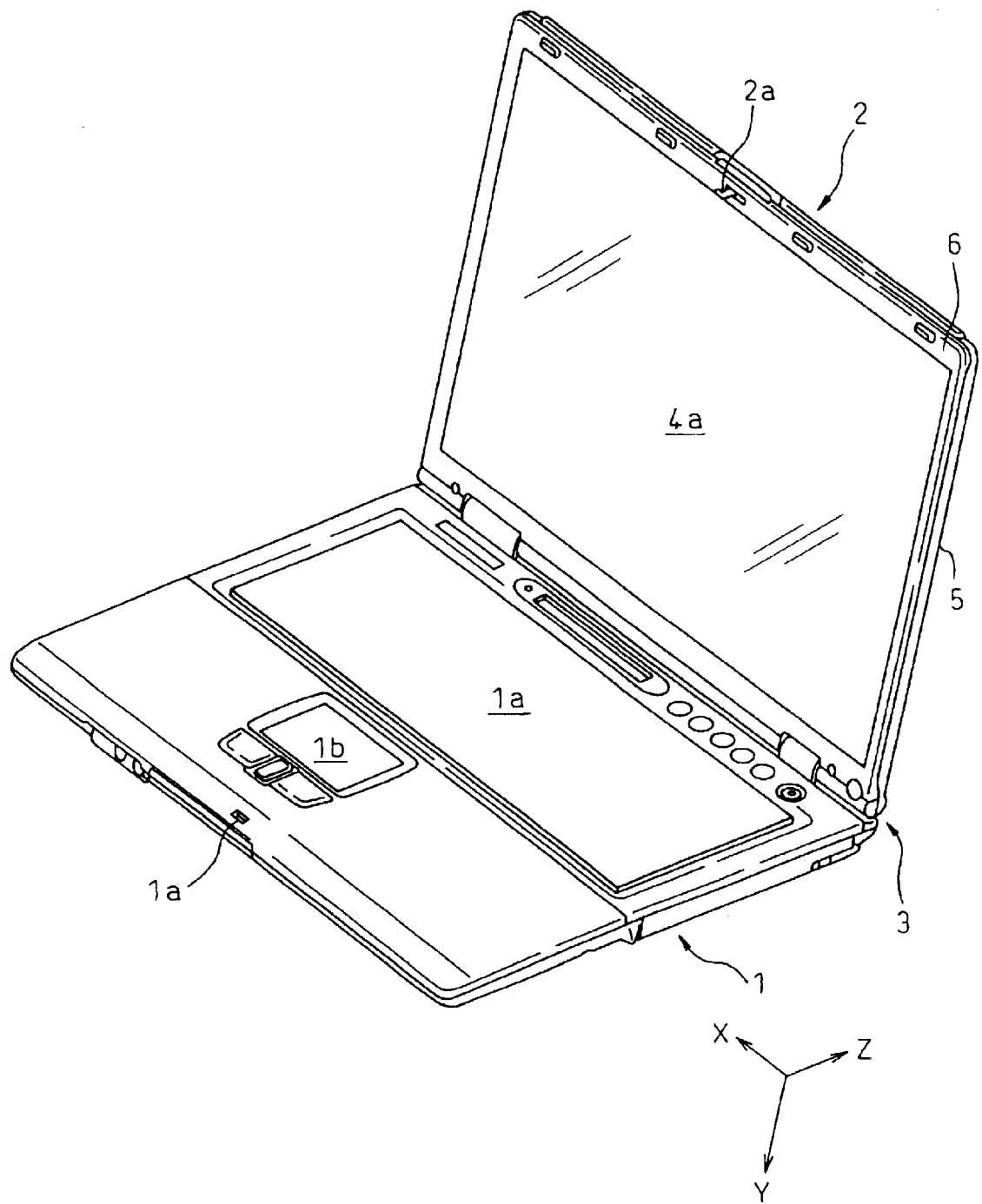
FIG. 2 is an external perspective view of the laptop computer of FIG. 1 in an open state.

Preferred embodiments of the present invention will be described in detail below while referring to the attached figures. FIG. 1 and FIG. 2 show an electronic device provided with the antenna according to the present invention, for example, a laptop computer. FIG. 1 shows the state with the device closed, while FIG. 2 shows the state with the device open.

The laptop computer is comprised of a main body 1 provided with a keyboard or pointer etc. and a lid provided with a liquid crystal display unit 4. The lid 2 is designed to be able to pivot with respect to the main body 1 by a hinge 3 and can be opened and closed with respect to the main body 1.

That is, the lid 2 can be opened when using the laptop computer and closed when not using it. When closing the lid 2, a lock member 1a provided at the main body 1 side is engaged with and the lid 2 is locked with the main body 1. When opening the lid 2, the lock member 1a is released to enable the lid 2 to be opened from the main body 1.

The housing forming the lid 2 is comprised of a back cover 5 and a front cover 6. The liquid crystal display (LCD) unit 4 is affixed by being sandwiched between the back cover 5 and the frame-shaped front cover 6.

The liquid crystal display unit 4 is formed overall as a rectangular plate. The periphery of the liquid crystal display screen 4a accounting for the majority of the region at the front side is surrounded by the rectangular frame-shaped front cover 6. The back cover 5 arranged at the back surface side covers the entire region of the back surface of the liquid crystal display unit 4.

In this way, the lid 2 is comprised of the back cover 5, the liquid crystal display unit 4, and the front cover 6, but in the present specification, both when the lid 2 is fastened with respect to the main body 1 and when in the state of use where it is opened, the hinge 3 side is called the "rear" and the opposite side is called the "front". Further, in the liquid crystal display unit 4, the back cover 5 is called the "rear", while the opposite side is called the "front". Further, regarding the planar directions of the liquid crystal display unit 4, the left-right direction is called the "x-direction", the front-back direction is called the "Y-direction", and the thickness direction of the liquid crystal display unit 4 is called the "Z-direction".

Figure 3A:
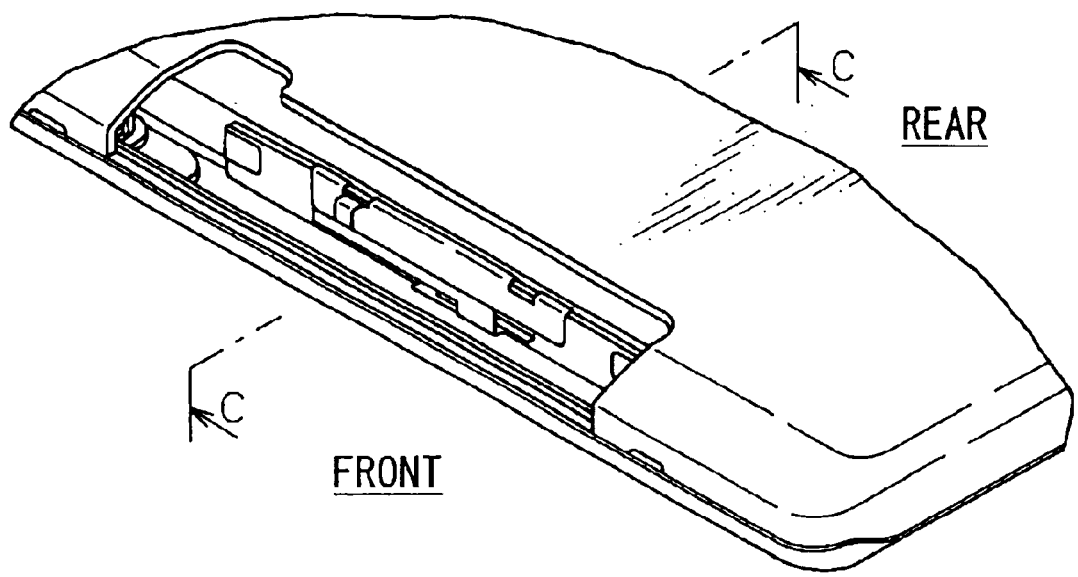
Figure 3B:
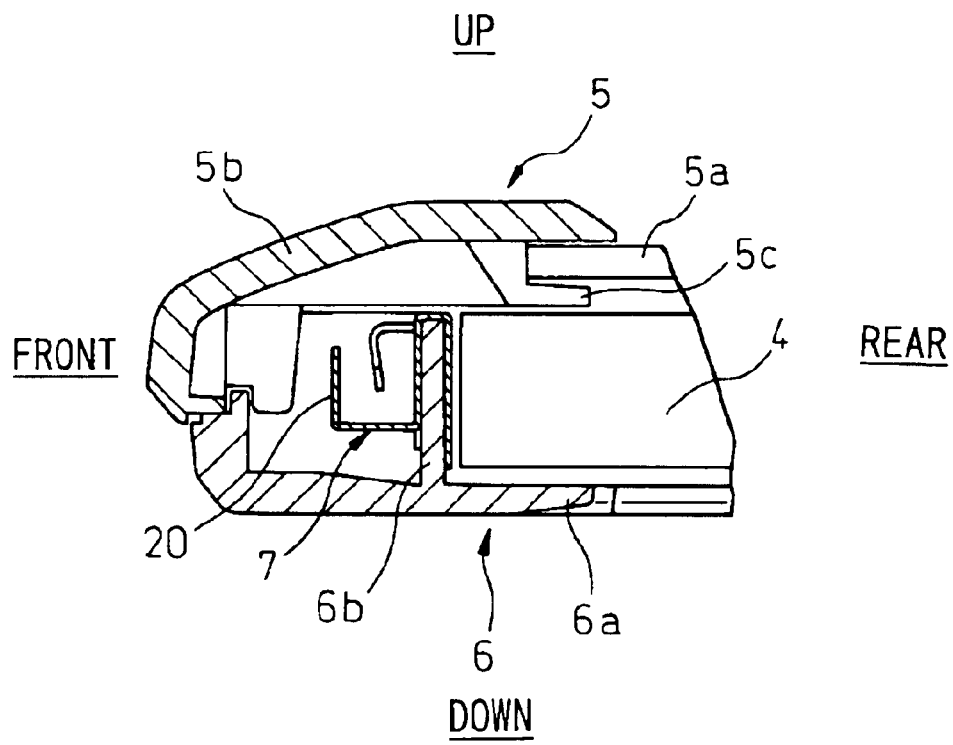
FIG. 3B is a sectional view along the line C—C of FIG. 3A.
Figure 4A:
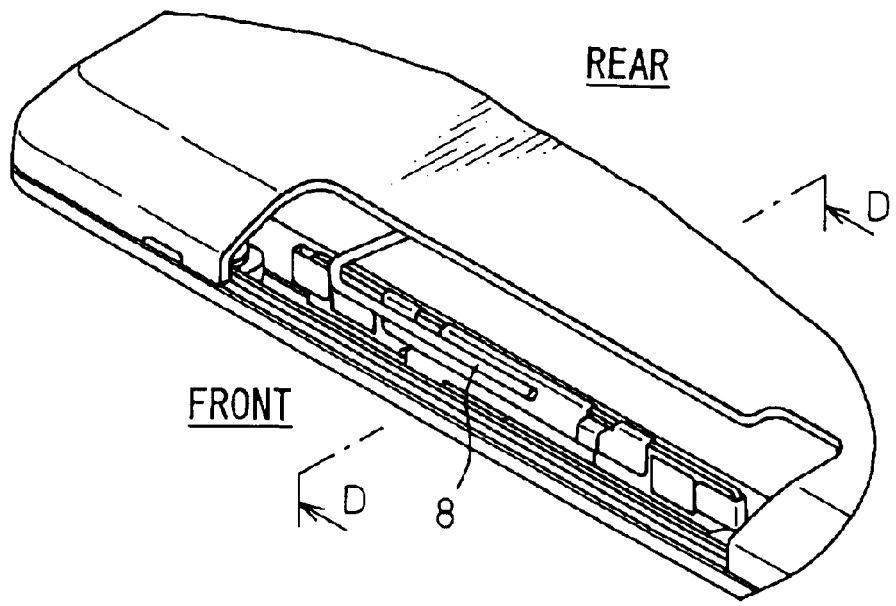
Figure 4B:
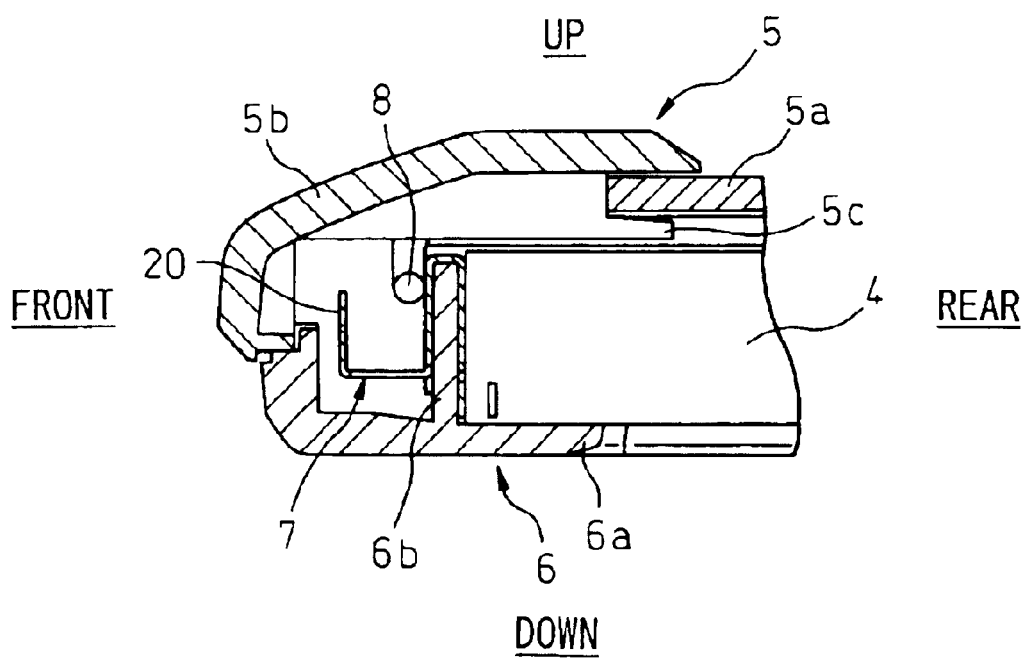
FIG. 4B is a sectional view along the line D—D of FIG. 4A.

FIG. 3A is a perspective view of the part of the lid 2 shown by A in FIG. 1. This is shown with the part of the cover cut away so that the location for mounting a first antenna of the present invention can be seen. FIG. 3B is a sectional view along the line C—C of that figure. Further, FIG. 4A is similarly a perspective view showing the part of the lid 2 shown by B in FIG. 1. This is shown with the part of the cover cut away so that the location for mounting a second antenna of the present invention can be seen. FIG. 4B is a sectional view along the line D—D of that figure.

The rectangular plate shaped main body part 5a occupying the majority of the region of the center of the back cover 5 is for example formed by a diecasting or other shaped article using a material such as a magnesium alloy. The periphery of the back cover 5, in particular the portion covering the antenna mounting part, that is, the antenna cover 5b, is formed from a suitable plastic, for example, polycarbonate. Further, a rectangular frame shaped front cover 6 is formed integrally from a suitable plastic, for example, an ABS resin.

The liquid crystal display unit 5 is held by being sandwiched between the back cover 5 and the front cover 6. That is, the periphery of the inner side of the back cover 5 is provided with a plurality of ribs 5c contacting the back surface of the liquid crystal display unit 4. The front cover 6 has the inside frame part 61 contacting the front periphery of the liquid crystal display unit and a plurality of projecting ridges 6b adjacent to the front, back, left, and right side walls of the liquid crystal display unit 4. Therefore, the liquid crystal display unit 4 is affixed by fitting the front cover 6 into the back cover 5 sandwiching the liquid crystal display unit 4.

This laptop personal computer 1 has a pair of left and right antennas of the present invention. The right side antenna 7 shown in FIG. 3A and FIG. 3B is held by the right side projecting ridge 6b provided at the front of the front cover 6. Similarly, the left side antenna 7 shown in FIG. 4A and FIG. 4B is held by the left side projecting ridge 6b at the front of the front cover 6. In this way, a pair of left and right projecting ridges 6b having predetermined lengths is arranged on the same line at the front of the front cover 6, and these projecting ridges 6b function to limit the front position in the Y-direction of the liquid crystal display unit 4 and hold the antennas 7 and further act to bring the antennas 7 into contact with the front end surface of the peripheral side frame comprised of the conductive parts of the liquid crystal display unit to connect them to the ground.

The pair of left and right projecting ridges 6b both have the same length and have predetermined heights (substantially corresponding to thickness of liquid crystal display unit 4 in the Z-direction) and predetermined thicknesses.

Figure 5A:
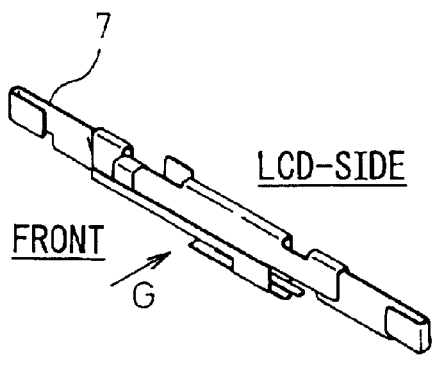
Figure 5B:
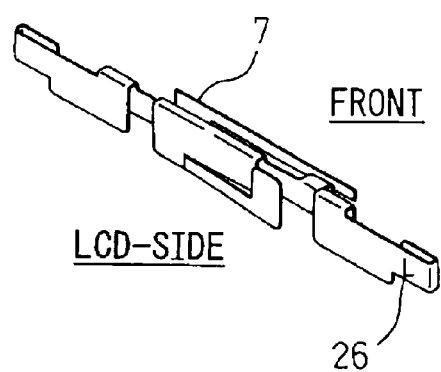
FIG. 5B is a perspective view of the antenna of the present invention seen from the side of the ground contact spring (liquid crystal display unit)

FIG. 5A is a perspective view of the antenna 7 of the present invention as seen from the front side, that is, the antenna ground side, while FIG. 5B is a similar view seen from the back side, that is, the ground contact spring side at the liquid crystal display unit 4.

The antenna 7 is suitably one formed integrally by sheet metal of a springy metal material having a good solder deposition ability and not surface treated. As the most suitable metal material, there is German silver etc. This German silver is basically an alloy of copper (Cu), nickel (Ni), and zinc (Zn). It is suitable for use as the material of the antenna of the present invention from this viewpoint as well. German silver with a high nickel content by nature does not change much in electrical resistance with respect to changes in temperature and is generally used for heat resistant electrical contact pieces or electrical regulating resistance materials, so is suitable for use as the antenna of the present invention. Further, German silver may include small amounts of lead (Pb), iron (Fe), and manganese (Mn). It has a beautiful luster, is superior in rollability, fatigue resistance, and corrosion resistance, and features abundant drawability. It is suitable for use as the material of the antenna of the present invention from this viewpoint as well.

Figure 8:
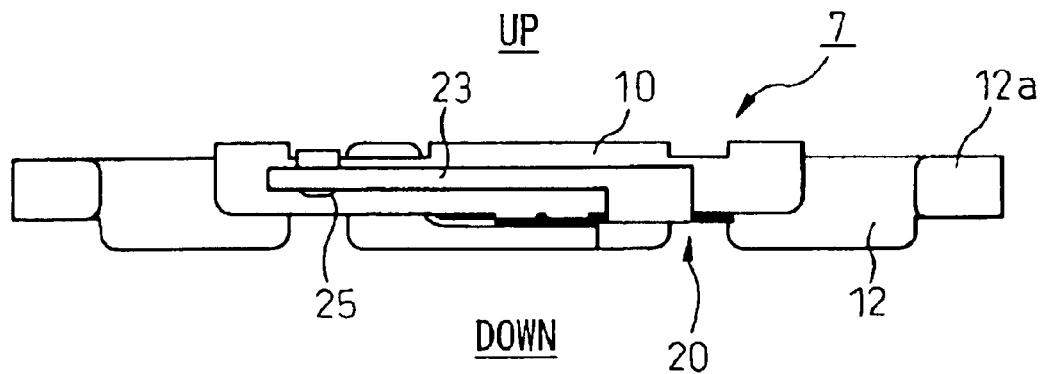
FIG. 8 is a front view of the antenna of the present invention.
Figure 9:
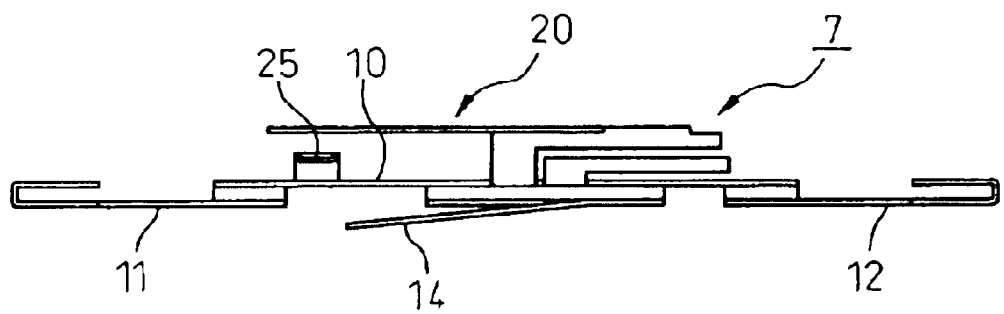
FIG. 9 is a bottom view of the antenna of the present invention.
Figure 10:
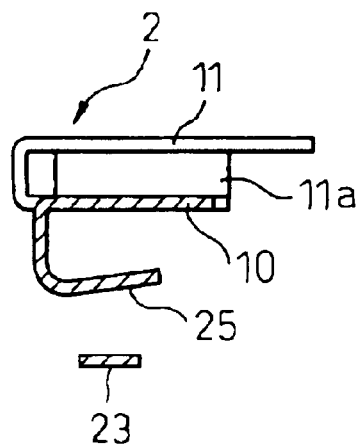
FIG. 10 is an enlarged sectional view along the line F—F of FIG. 7.

FIG. 6 shows the antenna 7 of the present invention and the liquid crystal display unit 4 (back side of FIG. 8). The antenna 7 is viewed from the side of the liquid crystal display unit 4. When mounting the antenna 7 at a predetermined fitting position of the projecting ridge 6b, the ground contact spring of the antenna 7 contacts the front end face of the liquid crystal display unit 4. That is, this state results when moving the liquid crystal display unit 4 in parallel in the direction of the arrow E. FIG. 7 is a view of the antenna 7 as seen from the arrow E of FIG. 6 and a left-right side view of the same. FIG. 8 is a front view of the antenna 7 when viewed from the direction of the arrow G of FIG. 5A, while FIG. 9 is a bottom view of the antenna 7.

The antenna 7 of the present invention has a center holder 10 contacting the main parts of the front wall of the projecting ridge 6b, two end holding plates 11, 12 straddling the top of the projecting ridge 6b from the two ends of the holding plate 1 and contacting the back wall of the projecting ridge 6b, and two end U-shaped affixing parts 11a, 11b obtained by bending the two ends of the projecting ridge 6b into U-shapes at the ends of the two end holding plates 11, 12 and contacting the front wall of the projecting ridge 6b at the front ends. Therefore, these center holder 10, two end holding plates 11, 12, U-shaped curved parts 11a, 12a, and back holder 13 explained next form a support of the antenna 7.

The antenna 7 of the present invention has a back holding plate 13 straddling the top of the projecting ridge 6 from the center holder 10 and contacting the back surface. A ground contact spring 14 is formed across a slit 15 from the back support plate 13 (FIG. 6). The ground contact spring 14 is inclined from its base toward the liquid crystal display unit 4 side by exactly a predetermined angle. When mounting the antenna 7 at the projecting ridge 6a, as explained above, it contacts the front wall of the liquid crystal display unit and connects to the ground.

The portion of the antenna 7 bent from the bottom side of the center holding plate 10 to the front is formed with the antenna element 20. This antenna 7 is a so-called dual type antenna and has two antenna elements 21, 22 extending to the right side in the horizontal direction and a directional antenna element 23 bent in a 90 degree vertical direction and extending in the opposite direction from the horizontal direction antenna elements. For example, the horizontal direction antenna elements 21, 22 are 5.2 GHz (4.9 to 5.8 GHz) elements, while the vertical direction antenna element 23 is a 2.4 GHz element. The element 20 of the antenna 7 is in a region inside of the antenna cover 5b of the back cover 5, so is not affected by external force etc. and can give a stable radiating characteristic.

The portion 24 of FIG. 7 shows the feeder point connecting the feeder line 8 of the antenna (FIG. 4A and FIG. 4B). Further, the hook 25 is for guiding the feeder line 8.

In this way, the antenna 7 of the present invention is formed integrally by sheet metal work on a single German silver or other metal sheet. The pair of left and right antennas 7, 7 have left-right symmetric shapes. For differentiating the two, for example, as shown by reference numeral 26 of FIG. 5B, one antenna 7 is given the "L (left)" mark, while the other antenna 7 is given the "R (right)" mark. Even when using two or more different shaped antennas, it is of course possible to employ marks corresponding to various applications so long as they enable identification of the locations for placement of the antennas.

Note that the pair of left and right antennas 7, 7 of this embodiment have symmetric directions of extension of the antenna elements and ground contact springs.

The pair of left and right antennas 7, 7 having the above shapes are fit into the projecting ridge 6b. When the liquid crystal display unit 4 is affixed sandwiched between the back cover 5 and the front cover 6, they are positioned in the up-down direction, left-right direction, and front-back direction.

FIG. 11 shows the wiring of the antenna in the case of use of the single antenna 7, while FIG. 12 shows the wiring in the case of use of a pair of left and right antennas as in the above embodiment. In these drawings, 7 indicates an antenna, 7L and 7R left and right antennas, 25 a hook for feeder lines, 30 a cotton tape, 32 a constriction tube, and 34 a connection terminal to be connected and fixed to the device body side.

The pair of feeder lines extending from the left and right antennas 7, 7 are bundled by the cotton tape 30, guided through the gap between the liquid crystal display unit 4 and the back cover 5, and connected to a not shown circuit of the device main body side at the terminal 34.

Summarizing the effects of the invention, as explained above, according to the present invention, it is possible to provide a laptop personal computer- or other device-carried antenna which utilizes conductors used for a liquid crystal display unit or other display unit and passes antenna current by a contact spring formed integrally by a material having springiness, so it is possible to improve the radiating characteristic of the antenna itself and secure good gain characteristic.

Further, according to the antenna of the present invention, screws etc. are not used to affix the antenna to the liquid crystal display unit in the structure and the antenna is mounted to the device in a manner straddling a projecting ridge of the housing of the device, so even if the dimensions or shape of the conductor parts of the liquid crystal display panel unit contacting the antenna change, an antenna of the same shape and dimensions can be used.

Further, according to the antenna of the present invention, even if the material of the metal plate forming the antenna is relatively small in modulus of elasticity, since the conductor parts of the functional unit are contacted in an elastically deformed state, a sufficient contact area can be secured and the radiating characteristic and gain characteristic of the antenna can be enhanced.

While the invention has been described with reference to specific embodiments chosen for purpose of illustration, it should be apparent that numerous modifications could be made thereto by those skilled in the art without departing from the basic concept and scope of the invention.

What is claimed is:

1. An antenna comprised of an antenna element, a support, and a ground contact spring formed integrally from sheet metal, wherein:
    said antenna element is located at one side with respect to said support, and
    said ground contact spring extends to the other side from said support in an elastically deformable manner.

2. An antenna as set forth in claim 1, wherein said support has a shape extending in a longitudinal direction and said ground contact spring is inclined with respect to a longitudinal direction of said support by a predetermined angle toward the outside.

3. An antenna as set forth in claim 2, wherein said sheet metal is springy sheet metal with a good solder deposition property and no surface treatment.

4. An antenna as set forth in claim 3, wherein the material of said sheet metal is German silver.

5. An antenna as set forth in claim 1, wherein said support is designed to straddle a projecting ridge extending in a longitudinal direction and has a shape enabling it to be attached and fixed to said projecting ridge, has at its two ends parts curved in U-shapes extending from one surface of said projecting ridge to the other surface, and is structured so that when said antenna is mounted on said projecting ridge, the U-shaped curved parts at the two ends of the antenna support in the longitudinal direction are fit over the two ends of the projecting ridge in the longitudinal direction to affix the same.

6. A device comprised of a housing having a projecting ridge, a functional unit having a conductor at its periphery and affixed to said housing so that at least part of said periphery adjoins said projecting ridge, and an antenna, wherein
    said antenna is comprised of a support designed to straddle said projecting ridge and supported by said housing, a ground contact spring extending from said support to the periphery of said functional unit and contacting at least part of the periphery of said functional unit, and an antenna element extending from said support to an opposite side of said support when seen from said ground contact spring, said support, ground contact spring, and antenna element being integrally formed by sheet metal.

7. A device comprised of a functional unit, a lid able to open and close with respect to said functional unit via a hinge and having a display, and an antenna, wherein said lid is provided with a housing having a projecting ridge and a display having a conductor at its periphery and affixed to said housing so that at least part of said periphery adjoins said projecting ridge, and said antenna is comprised of a support designed to straddle said projecting ridge and supported by said housing, a ground contact spring extending from said support to the periphery of said functional unit and contacting at least part of the periphery of said functional unit, and an antenna element extending from said support to an opposite side of said support when seen from said ground contact spring, said support, ground contact spring, and antenna element being integrally formed by sheet metal.

8. A device as set forth in claim 6 or 7, wherein said support extends in a longitudinal direction so as to be able to straddle said projecting ridge extending in said longitudinal direction by a predetermined dimension, said ground contact spring is inclined with respect to a longitudinal direction of said support by a predetermined angle toward the conductive side of said display, and said ground contact spring is brought into elastic contact with the conductive side of said display when mounting the antenna to the projecting ridge.

9. A device as set forth in claim 6 or 7, wherein:

a pair of projecting ridges of said lid housing is provided at an interval on the same line along the front surface of said display, and a pair of antennas is mounted on the pair of projecting ridges.

10. A device as set forth in claim 6 or 7, wherein:

said support has at the two ends of said projecting ridge extending in a longitudinal direction parts curved into U-shapes extending from one surface of the front surface and back surface of said projecting ridge to the other surface, and the U-shaped curved parts at the two ends in the longitudinal direction of said antenna support are fit over the two ends in the longitudinal direction of said projecting ridge to affix the same.

11. A device as set forth in claim 6 or 7, wherein said sheet metal is springy sheet metal with a good solder deposition property and no surface treatment.

12. A device as set forth in claim 6 or 7, wherein the material of said sheet metal is German silver.

13. A device as set forth in claim 6 or 7, wherein said functional unit or display is a liquid crystal display unit.

14. A device as set forth in claim 6 or 7, wherein said device is a laptop personal computer.

15. A device as set forth in claim 6 or 7, wherein:

said functional unit is a liquid crystal display unit, and the projecting ridge of the device housing is a projecting ridge provided at a front surface of the device at an opposite side to the hinge of the liquid crystal display unit.

16. A method of affixing an antenna comprised of an antenna element, a support, and a ground contact spring formed integrally from sheet metal, said antenna element being located at one side with respect to said support and said ground contact spring being located at the other side extending from said support in an elastically deformable manner, said method comprising mounting the support of said antenna to a projecting ridge so as to straddle said projecting ridge and bringing said ground contact spring into contact with the ground conductor at the same time as mounting.

17. A method of affixing an antenna as set forth in claim 16, further comprising using as said support one having a shape extending in the longitudinal direction, inclining said ground contact spring with respect to the longitudinal direction of said support by a predetermined angle to the outside, and fitting said support over said projecting ridge to straddle said projecting ridge and thereby affix the same.

18. A method of affixing an antenna as set forth in claim 17, further comprising using as said sheet metal springy sheet metal with a good solder deposition property and no surface treatment.

19. A method of affixing an antenna as set forth in claim 18, further comprising using as the material of said sheet metal German silver.

20. A method of affixing an antenna as set forth in claim 16, further comprising using as said support one having at two ends of said projecting ridge extending in a longitudinal direction portions bent into U-shapes extending from one surface of said projecting ridge to the other surface and fitting the U-shaped curved parts at the two ends in the longitudinal direction of said antenna support over the two ends in the longitudinal direction of said projecting ridge so as to mount said antenna on said projecting ridge.

21. A device comprised of a functional unit, a lid able to open and close with respect to said functional unit via a hinge and having a display, and an antenna, wherein said lid is provided with a housing having a projecting ridge for mounting said antenna and a display having a conductor at least at part of its periphery and affixed to said housing so that at least part of the periphery adjoins said projecting ridge.

22. A device as set forth in claim 21, wherein a pair of projecting ridges of said housing of said lid are provided at an interval on the same line along the front surface of said display.

23. A device as set forth in claim 21, wherein:

said support has at the two ends of said projecting ridge extending in a longitudinal direction parts curved into U-shapes extending from one surface of the front surface and back surface of said projecting ridge to the other surface, and the U-shaped curved parts at the two ends in the longitudinal direction of said antenna support are fit over the two ends in the longitudinal direction of said projecting ridge to affix the same.

24. A device as set forth in claim 21, wherein one of said functional unit and display is a liquid crystal display unit.

25. A device as set forth in claim 21, wherein said device is a laptop personal computer.

26. A device as set forth in claim 21, wherein:

the functional unit is a liquid crystal display unit, and the projecting ridge of the device housing is a projecting ridge provided at a front surface of the device at an opposite side to the hinge of said liquid crystal display unit.

27. A device as set forth in claim 21, wherein:

a pair of projecting ridges of said housing of said lid are provided at an interval on the same line along the front surface of said display, and a pair of antennas is mounted on the pair of projecting ridges.

28. A device comprising a housing having a projecting ridge, a functional unit having a conductor at least at part of its periphery and affixed to said housing so that at least part of said periphery adjoins said projecting ridge, and an antenna, wherein a ground contact spring is arranged to contact a ground conductor of said functional unit at the same time as mounting of said antenna.

29. A device provided with a functional unit, a lid able to open and close with respect to said functional unit via a hinge and having a display, and an antenna, wherein said lid is provided with a housing having a projecting ridge and a display having a ground conductor at least at part of its periphery and affixed to said housing so that said side surface adjoins said projecting ridge, and a ground contact spring is arranged to contact the ground conductor of said functional unit at the same time as mounting of said antenna.

* * * * *